Patented Oct. 8, 1929

1,730,729

UNITED STATES PATENT OFFICE

ERWIN HOFFA, ERNST RUNNE, AND ERWIN THOMA, OF HOCHST-ON-THE-MAIN, GERMANY, ASSIGNORS TO GENERAL ANILINE WORKS, INC., OF NEW YORK, N. Y., A CORPORATION OF DELAWARE

CHLORSUBSTITUTED PRODUCT OF THE 1-AMINO-2.4-DIMETHYLBENZENE AND PROCESS OF PREPARING IT

No Drawing. Application filed September 21, 1927, Serial No. 221,133, and in Germany October 6, 1926.

Our present invention relates to chlorsubstituted products of 1-amino-2.4-dimethylbenzene and a process of preparing them.

We have found that, when chlorine is caused to act upon a solution of 1-amino-2.4-dimethylbenzene in concentrated sulfuric acid, the chlorine enters in meta-position to the amino group and we have ascertained that by the reaction there is produced the 3-chloro-1-amino-2.4-dimethylbenzene as well as the 5-chloro-1-amino-2.4-dimethylbenzene. We have moreover found that when the action of the chlorine is continued a second chlorine atom very easily enters the nucleus with formation of 3.5-dichloro-1-amino-2.4-dimethylbenzene. From the experiments made with the chlorination of other arylamines in sulfuric acid it could not be expected that the said dichloro compound would be formed so easily. By our invention there are accordingly obtainable compounds of the following formula:

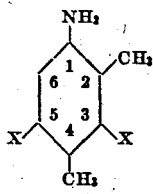

wherein X stands for chlorine or for hydrogen, but at least one X represents chlorine.

In elaborating the process for preparing 3.5-dichloro-1-amino-2.4-dimethylbenzene we have discovered that the base in question forms a sulfate which is very difficultly soluble in concentrated sulfuric acid. By choosing the proper degree of concentration it is possible to effect the separation of the said sulfate during the chlorinating process and before considerable quantities of more highly chlorinated compounds are produced. The sulfate is separated by filtering it by suction and the mother liquor of the sulfuric acid may be used for a further operation. In this manner, 3.5-dichloro-1-amino-2.4-dimethylbenzene is directly obtainable in a purity sufficient for all technical purposes. Our new process therefore offers the advantage that it avoids further onerous operations for the separation of 3.5-dichloro-1-amino-2.4-dimethylbenzene and the further advantage of being economical because it requires only a very small consumption of sulfuric acid.

The separation or crystallization of the sulfate of 3.5-dichloro-1-amino-2.4-dimethylbenzene may also be effected and a pure product obtained if the concentrated sulfuric acid is slightly diluted so that the chlorination mass can be mixed with a small quantity of water or ice.

Owing to the fact that the sulfate is difficultly soluble in pure or highly concentrated technical acid there may be used as parent material a less pure meta-xylidine without having to fear any separation of impure products.

The following examples serve to illustrate our invention but they are not intended to limit it thereto, the parts being parts by weight.

1. 121 parts of 1-amino-2.4-dimethylbenzene are dissolved, while cooling, in 1500 parts of crude sulfuric acid and then, after addition of 2 parts of ferric chloride, chlorinated, while cooling with ice, with 78 parts of chlorine. The chlorine is introduced in a finely subdivided form while vigorously stirring. After chlorination the mass is placed on 3000 parts of ice. The chlorinated bases precipitate in the form of their difficultly-soluble sulfates. The free bases are produced therefrom by decomposition by means of a caustic soda solution. The product which is at first of an oily character crystallizes by about one half. The crystals which separate constitute 5-chloro-1-amino-2.4-dimethylbenzene. Its base melts after recrystallization from petroleum ether at 97° C.–98° C. By cooling the residual oil, crystals are separated which are converted into the hydrochloride and purified by recrystallization. The base liberated therefrom by means of an alkali constitutes 3-chloro-1-amino-2.4-dimethylbenzene of the following constitution:

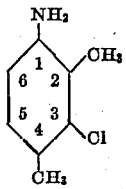

It has a melting point of 47° C. and is identical with the compound prepared like the corresponding bromine-compound according to the directions given by Nölting and Thesmar (see Berichte der Deutsch. Chem. Gesellschaft, vol. 34, page 2254).

2. 121 parts of 1-amino-2.4-dimethylbenzene, 2 parts of anhydrous ferric chloride dissolved in 4000 parts of crude sulfuric acid, are chlorinated with 157 parts of chlorine at ordinary temperature by a counter-current produced in a trickling-tower filled with so-called "Raschig" rings. After the chlorinating process is complete, the mass is put on 17000 parts of ice. From the sulfate which is very difficultly soluble in water, the base is liberated by adding a caustic soda solution. By recrystallization of the crude product from petroleum ether the pure 3.5-dichloro-1-amino-2.4-dimethylbenzene of a melting point of 56° C.-57° C. is obtained, which has the following constitution:

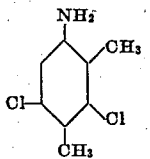

3. 121 parts of 1-amino-2.4-dimethylbenzene are dissolved in 1200 parts of crude sulfuric acid and after addition of 2 parts of ferric chloride the solution is chlorinated, while vigorously stirring, with 145 parts of chlorine in a finely subdivided state. From the mass there precipitates already during the chlorination process 3.5-dichloro-1-amino-2.4-dimethylbenzene as a sulfate. The base prepared therefrom without any further purification melts at 53° C.-55° C. Its filtrate from sulfuric acid can be utilized as solvent in further operations.

4. 121 parts of crude, asymmetrical meta-xylidine are dissolved in 1700 parts of crude sulfuric acid and chlorinated with 130 parts of chlorine in the manner indicated in Examples 2 or 3. Shortly after the chlorination is complete, the mass is mixed and stirred with 80 parts of water or ice. 3.5-dichloro-1-amino-2.4-dimethylbenzene precipitates as a sulfate.

The products obtainable according to the foregoing examples may also be prepared by using as catalyst substances other than those already mentioned, for instance iodine, or by using no catalyst at all.

We claim:

1. The process for preparing compounds of the following constitution:

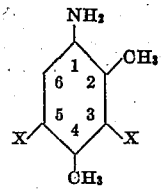

wherein X stands for chlorine or for hydrogen, but at least one X represents chlorine, which consists in treating a solution of 1-amino-2.4-dimethylbenzene in concentrated sulfuric acid with the quantity of chlorine required for obtaining the desired final product, while avoiding any rise of temperature, precipitating the reaction product in form of its sulfate, and converting it into the free base by means of a caustic soda solution.

2. The process for preparing compounds of the following constitution:

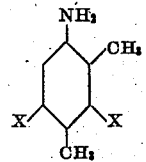

wherein X stands for chlorine or for hydrogen, but at least one X represents chlorine, which consists in treating a solution of 1-amino-2.4-dimethylbenzene in concentrated sulfuric acid with the quantity of chlorine required for obtaining the desired final product while avoiding any rise of temperature, in the presence of a halogen carrier precipitating the reaction product in form of its sulfate, and converting it into the free base by means of a caustic soda solution.

3. The process for preparing compounds of the following constitution:

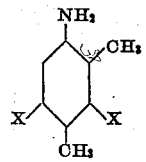

wherein X stands for chlorine or for hydrogen, but at least one X represents chlorine, which consists in treating a solution of 1-amino-2.4-dimethylbenzene in concentrated sulfuric acid with the quantity of chlorine required for obtaining the desired final product while avoiding any rise of temperature, in the presence of ferric chloride, precipitating the reaction product in form of its sulfate, and converting it into the free base by means of a caustic soda solution.

4. The process for preparing 3.5-dichloro-1-amino-2.4-dimethylbenzene, which consists in treating a solution of one equivalent of 1-amino-2.4-dimethylbenzene in concentrated sulfuric acid with two equivalents of chlorine while avoiding any rise of temperature and converting the sulfate which precipitates, into the free base by means of a caustic soda solution.

5. The process for preparing 3.5-dichloro-1-amino-2.4-dimethylbenzene, which consists in treating a solution of one equivalent of 1-amino-2.4-dimethylbenzene in concentrated sulfuric acid with two equivalents of chlorine while avoiding any rise of temperature, in the presence of a halogen carrier, and converting the sulfate which precipitates, into the free base by means of a caustic soda solution.

6. The process for preparing 3.5-dichloro-1-amino-2.4-dimethylbenzene, which consists in treating a solution of one equivalent of 1-amino-2.4-dimethylbenzene in concentrated sulfuric acid with two equivalents of chlorine while avoiding any rise of temperature in the presence of ferric chloride, and converting the sulfate which precipitates, into the free base by means of a caustic soda solution.

7. The process for preparing 3.5-dichloro-1-amino-2.4-dimethylbenzene, which consists in treating a solution of one equivalent of commercial crude 1-amino-2.4-dimethylbenzene in concentrated sulfuric acid with two equivalents of chlorine while avoiding any rise of temperature, in the presence of ferric chloride and converting the sulfate which precipitates into the free base by means of a caustic soda solution.

8. The process for preparing 3.5-dichloro-1-amino-2.4-dimethylbenzene, which consists in treating a solution of one equivalent of 1-amino-2.4-dimethylbenzene in as little a quantity as possible of concentrated sulfuric acid with two equivalents of chlorine, while avoiding any rise of temperature, in the presence of ferric chloride and converting the sulfate which precipitates into the free base by means of a caustic soda solution.

9. The process for preparing 3.5-dichloro-1-amino-2.4-dimethylbenzene, which consists in treating a solution of one equivalent of commercial crude 1-amino-2.4-dimethylbenzene in as little a quantity as possible of sulfuric acid with two equivalents of chlorine, while avoiding any rise of temperature, in the presence of ferric chloride and converting the sulfate which precipitates into the free base by means of a caustic soda solution.

10. As new products the compounds of the following constitution:

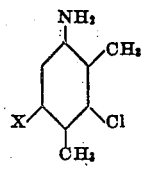

wherein X stands for hydrogen or chlorine, being crystalline bodies which can be purified by way of their hydrochlorides and form sulfates which are difficultly soluble in water.

11. As a new product, the compound of the following constitution:

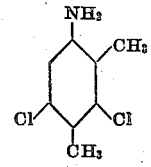

being a crystalline body having a melting point of 56° C. to 57° C. and forming a sulfate which is difficultly soluble in water and concentrated sulfuric acid.

In testimony whereof, we affix our signatures.

ERWIN HOFFA.
ERNST RUNNE.
ERWIN THOMA.